Aug. 21, 1962 C. N. DREVALAS 3,049,758

MOLDING MACHINE

Filed Jan. 29, 1958 2 Sheets-Sheet 1

INVENTOR
C.N.DREVALAS
BY R.P. Miller
ATTORNEY

Aug. 21, 1962   C. N. DREVALAS   3,049,758
MOLDING MACHINE
Filed Jan. 29, 1958   2 Sheets-Sheet 2

INVENTOR
C. N. DREVALAS
BY R. P. Miller
ATTORNEY

United States Patent Office 3,049,758
Patented Aug. 21, 1962

3,049,758
MOLDING MACHINE
Constantine N. Drevalas, Maywood, Ill., assignor to Western Electric Company, Incorporated, New York, N.Y., a corporation of New York
Filed Jan. 29, 1958, Ser. No. 711,833
2 Claims. (Cl. 18—42)

This invention relates to a machine for molding plastic articles and more particularly to new and useful improvements in stripper and ejector mechanisms for use in dies having undercut portions.

In molding operations, a problem exists in removing a casting, from a core in a die having undercuts, without damage to the part or the die. Previous apparatus for removal of such work pieces having projections thereon required time-consuming manipulations of complicated die mechanisms with the result of unnecessary expense in labor, manufacture and maintenance.

It is the primary object of this invention to provide an ejector mechanism for ejecting a molded part having lateral projections thereon from a die having a core and undercuts without damaging the part.

Another object of the invention is to provide an ejector mechanism for ejecting a molded part with a single retraction movement of one section of the die.

A further object of the invention resides in a molding apparatus providing for rapid sequential automatic operation of a molding die and an ejector mechanism.

With these and other objects in view, the present invention contemplates an apparatus for molding and ejecting articles having lateral projections thereon, wherein a core is slidably mounted within a movable die and occupies part of a die cavity. The core is moved away from a stationary die and moves the movable die therewith until the movable die is retained by the engagement of a pin rigidly mounted thereto with a slide movably mounted on a secondary ejector plate. Continued movement of the core, strips the core from the now retained movable die and, upon further movement of the core, an aperture in the slide is moved into alignment with an opening in a primary ejector member and permits the pin to pass therein so that the core will thereupon move the die toward the primary ejector member. A secondary ejector member having pins rigidly mounted thereon to extend through the core is movably mounted on the pin of the die. The die moves on the ejector pins which now strike and positively eject the part from the die.

Other objects, advantages and novel features of the invention will become apparent when considered in conjunction with the accompanying drawings wherein.

Figure 1:
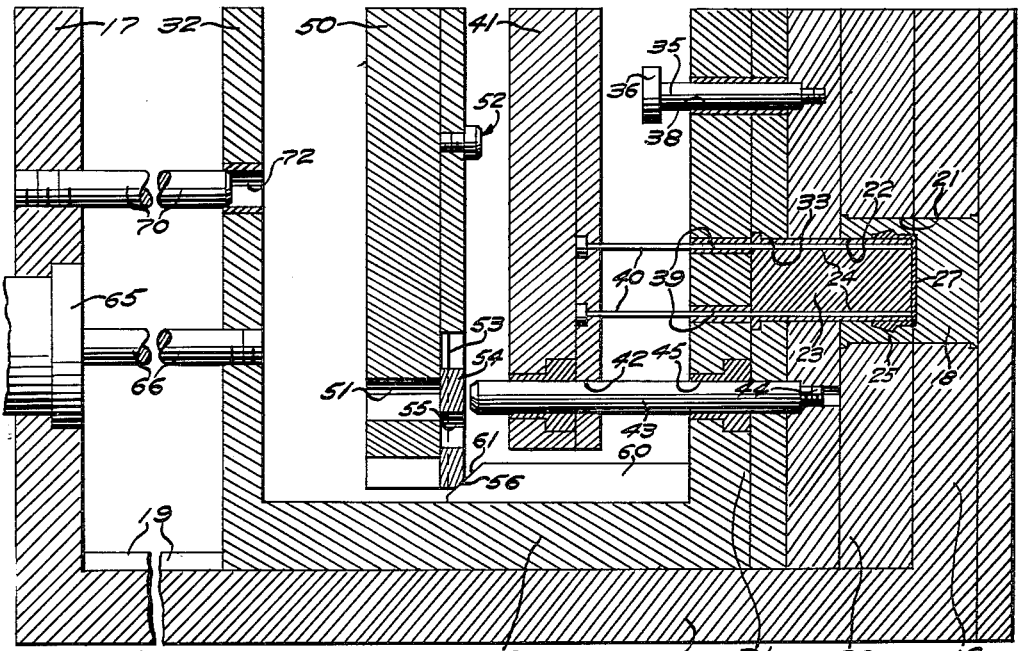
FIG. 1 is a sectional view of molding dies and an ejector mechanism showing the dies in closed position embodying the principles of the invention.
Figure 2:
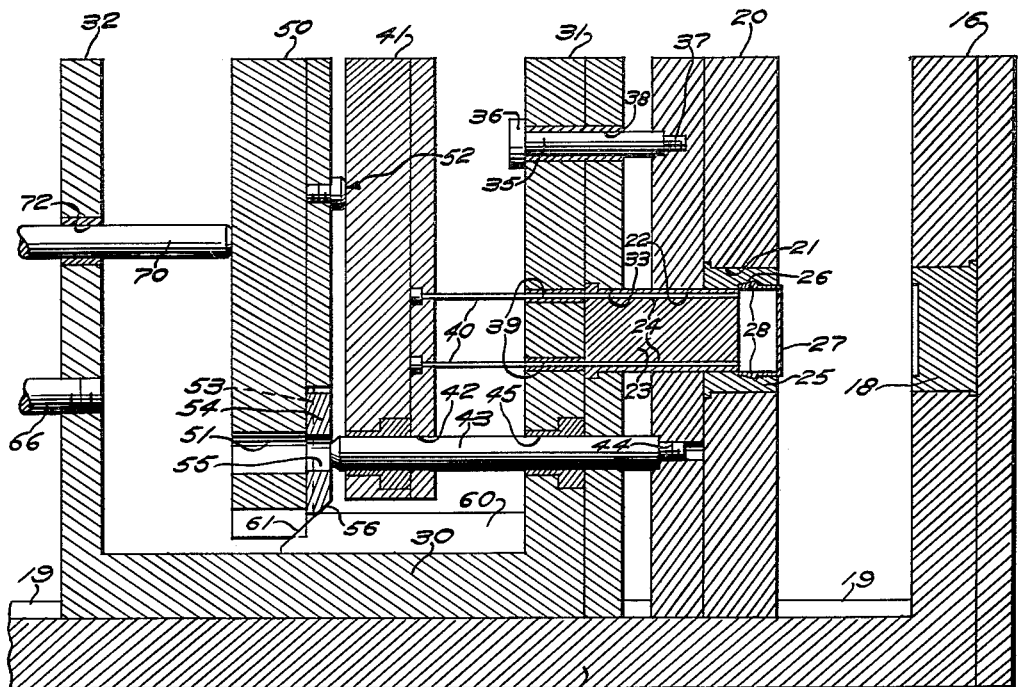
FIG. 2 is a sectional view of the dies and the ejector mechanism showing a core stripped from a molded part.
Figure 3:
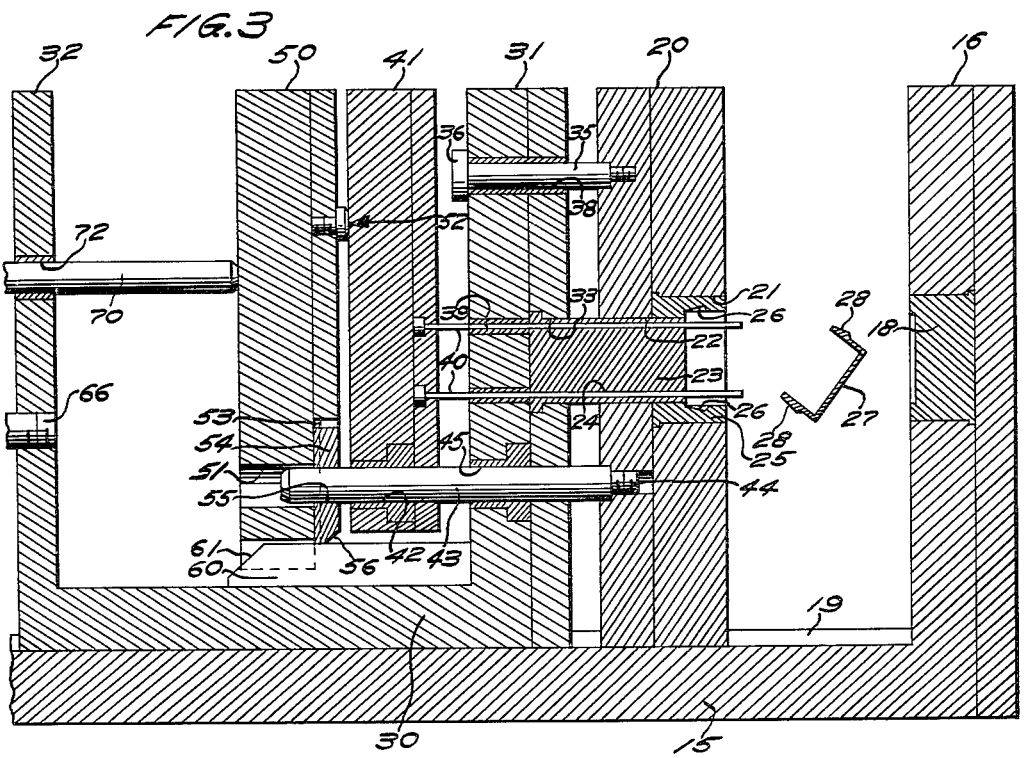
FIG. 3 is a sectional view of the dies and the ejector mechanism showing ejector pins actuated to eject the molded part.
Figure 4:
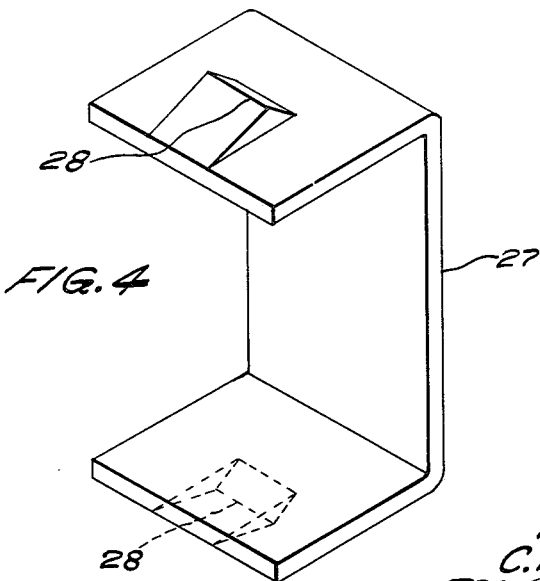
FIG. 4 is a perspective view of a molded part having wedge-shaped projections on the outer surface thereof.

Referring to the drawings, there is illustrated a molding machine, FIGS. 1–3, having a stationary base 15 with end plates 16 and 17 projecting upwardly therefrom. A die 18 is mounted in the end plate 16. Base 15 is provided with a keyway 19 and a movable die holder 20 is mounted slidably in the keyway 19. The movable holder 20 has a die retaining opening 21 and a reduced aperture 22 receiving a core 23. Core 23 has ejector passageways 24 longitudinally extending therethrough. A shell-like die 25 is secured in opening 21 of the die holder 20 and has undercuts 26 formed in the opposing walls of the die. A molded part 27 with projections 28, FIGS. 3 and 4, is shown as being formed in the cavity defined by the core 23 and the dies 18 and 25.

A yoke 30 is slidably mounted in keyway 19 and has arms 31 and 32. Arm 31 of the yoke 30 has a stepped opening 33 into which the core 23 is fitted and rigidly mounted. A retaining pin 35 having head 36 is screwed in a threaded bore 37 formed in the holder 20 and is slidable in an opening 38 formed in yoke arm 31 to provide a lost-motion connection between the yoke arm 31 and the die holder 20. A pair of apertures 39 are provided in yoke arm 31 to receive a pair of ejector pins 40. Ejector pins 40 are rigidly mounted on a primay ejector plate 41 to extend through the openings 39 of yoke arm 31 and the aligned passageways 24 of core 23.

Ejector plate 41 has an opening 42 into which passes a rod 43 that is rigidly affixed to movable die holder 20 at 44. The rod 43 is also movably mounted in opening 45 of yoke arm 31.

A secondary ejector plate 50 is slidably mounted on the yoke 30 between the ejector plate 41 and yoke arm 32. The secondary ejector plate 50 contains an aperture 51 to receive rod 43 and has a stud 52 to engage ejector plate 41. Also, ejector plate 50 has keyway 53 in which is mounted a slide 54 containing aperture 55 and beveled surface 56. A cam 60 is attached to a yoke 30 and has an inclined camming surface 61 that is adapted to engage surface 56 of slide 54. Yoke 30 is reciprocated by an air cylinder 65 operating a piston rod 66 that is connected to the yoke arm 32. Pin 70 is secured to the end plate 17 and is slidably positioned in an aperture 72 of yoke arm 32.

In operation, to remove the molded part from the dies 18 and 25 and core 23, air is admitted to cylinder 65 to move piston rod 66 and the yoke 30 to the left. The adhesion of the molded part to the core, the friction between the core 23 and the die holder 20, and the friction between the yoke arm 31 and the rod 43 and the headed pin 35 cause the die 25 and the holder 20 to tend to move with the core 23 which is affixed to the yoke 30. During this movement, both the primary and secondary ejector plates 41 and 50 will move unitarily with yoke 30 and the die holder 20. Die holder 20 continues to follow the movement of the yoke until the rod 43 moves the secondary ejector plate 50 into engagement with stationary pin 70. At this point, die 25 will be in a position separated from die 18 (see FIG. 2) and upon continued leftward movement of yoke 30, the rod 43 will be retained by slide 54 and thus the yoke 30 separates from the die holder 20 and continues to move to the left until yoke arm 31 strikes the head 36 of the retainer pin 35. This separation of the yoke arm 31 and the die holder 20 causes core 23 to be extracted from the molded part 27, as shown in FIG. 2. The movement of yoke 30, necessary for separating yoke arm 31 from die holder 20 to extract the core therefrom, allows the cam surface 61 to move against surface 56 of slide 54 thereby moving slide 54 upwardly so as to align the aperture 55 therein with aperture 51 of the secondary ejector plate 50, to allow subsequent passage of rod 43 therethrough. Also during this movement, the retraction of the core 23 causes the primary ejector plate 41 to move to the left and into engagement with the stud 52 of the secondary ejector plate 50 and to thereupon force plate 50 against pin 70 to hold ejector plates 41 and 50 stationary. Further movement of yoke 30 to the left causes yoke arm 31 to move the pin 35 and thus the die holder 20. The continuous movement of yoke 30 moves rod 43 into the now exposed apertures 51 and 55 of stationarily held ejector plate 50 and slide 54, respectively.

The leftward movement of yoke 30 causes yoke arm 31 to approach the now stationarily held ejector plate 41 which holds the ejector pins 40 against further movement to the left as the die holder 20 is moved to the left. Thus, the die holder 20 and the die 25 move relative to the ejector pins whereupon said pins function to positively eject the molded part 27 from the die 25.

As the ejector pins 40 move the molded part from the die 25, the projections 28 of the molded part react on the undercut portions of the die to cam the arms of the molded part inwardly, thereby permitting ejection of the part.

Actuation of the yoke 30 to the right by air cylinder 65 and piston rod 66, causes the core 23 to move to the right and re-enter die 25. Upon engagement of die holder 20 with the end plate 16, the yoke arm 31 will move to engage the holder 20 and the ejector pins 40 will be moved to the left thereby within the core 23. This leftward movement of the ejector pins 40 will move the ejector plates 41 and 50 to the left on the rod 43 and will retract rod 43 from apertures 51 and 55 of the backing plate 50 and slide 54. Thus, as the cam 60 also moves to the right with the yoke 30, the slide is permitted to move down into its original position. The dies will then be in position for another molding operation.

It is also to be understood that the abovedescribed arrangements of apparatus and construction of elemental parts are simply illustrative of an application of the principles of the invention and many other modifications may be made without departing from the spirit and scope of the invention.

What is claimed is:

1. In a molding apparatus, a pair of first and second dies, a movable die holder for mounting the first of said dies, a yoke having a first arm and a second arm, means for mounting the yoke for movement toward and away from said second die, a core secured to said first arm and projecting into said first die, a plurality of ejector pins slidably mounted within said core, a primary ejector plate mounted between said yoke arms and connected to said ejector pins, said second arm having an aperture formed therein, a stop pin positioned in alignment with the aperture formed in the second arm, means for moving the yoke away from said second die whereby the stop pin passes through said aperture and said first arm moves from the die holder, a headed retaining pin interconnecting the first arm and the holder for permitting limited movement of the first arm with respect to the holder whereafter the die holder moves with said first arm; the combination with said die holder of a rod projecting therefrom and through the first arm and said primary ejector plate, a secondary ejector plate movably mounted between said second arm and said primary ejector plate, said secondary ejector plate having an aperture formed therein in alignment with said rod, a slide having an aperture formed therein mounted on said secondary ejector plate so that a non-apertured portion is positioned in alignment with the end of the rod to engage and hold said rod and die holder while the first arm withdraws the core from within the first die, and a cam mounted on the yoke for lifting said slide to present the aperture to the rod when the yoke is advanced to move the primary ejector plate into engagement with the secondary plate held by the stop pin whereby further movement of the yoke advances the die holder relative to said ejector pins.

2. Apparatus for molding and then ejecting an article having a base, a pair of arms projecting outward from the base, and a sloping projection on the exterior surface of each arm; which comprises a fixed die designed for molding the exterior surface of the base of the article, a shell-like movable die designed for molding the exterior surfaces of the arms of the article and having undercuts formed in the interior walls thereof which operate to mold the sloping projections, a movable die holder mounting said movable die for movement toward and away from said fixed die, a core slidably received within said movable die and designed for molding the interior surfaces of both the arms and the base of the article, a yoke mounting said core for movement into and out of said movable die, ejector pins slidable within said yoke and said core, the apparatus being so constructed and arranged that the molded article is released from the molding elements in stages by moving said yoke continuously away from said fixed die whereby said movable die holder and said ejector pins first move with said yoke to separate the article from said fixed die, means for temporarily stopping the movement of said movable die holder with said yoke whereupon further movement of said yoke causes retraction of said core from within said movable die to separate the article from said core, means for stopping the movement of said ejector pins with said yoke, and means for constraining movement of said movable die holder with said core whereupon said ejector pins push against the interior surface of the base of the article and the arms of the molded article are cammed inwardly to dislodge the projections on the article from the undercuts of said movable die to eject the article from said movable die.

References Cited in the file of this patent
UNITED STATES PATENTS

| | | |
|---|---|---|
| 2,483,093 | Harvey | Sept. 27, 1949 |
| 2,483,094 | Harvey | Sept. 27, 1949 |